United States Patent [19]

Sugawara et al.

[11] 4,240,943

[45] Dec. 23, 1980

[54] TEXTILE FINISHING COMPOSITION

[75] Inventors: Eiichi Sugawara, Kawaguchi; Takao Endoh, Iwatsuki; Satoshi Shioume, Ageo; Tomio Kuroki; Kazuhiro Teramae, both of Ohtsu, all of Japan

[73] Assignees: Dainichiseika Color & Chemicals Mfg. Co., Ltd., Tokyo; Toyo Boseki Kabushiki Kaisha, Osaka, both of Japan

[21] Appl. No.: 881,742

[22] Filed: Feb. 27, 1978

[51] Int. Cl.$^3$ .................. C08L 61/22; D06M 15/54; D06M 15/52

[52] U.S. Cl. .................. 260/29.4 R; 260/29.2 TN; 252/8.8; 525/456; 427/393.2; 428/425.1; 428/425.3

[58] Field of Search ............. 252/8.8 B; 8/192, 187, 8/DIG. 11; 260/29.2 TN, 29.4 R; 525/456; 528/59, 266; 428/425.1, 425.3; 427/393.2

[56] References Cited

U.S. PATENT DOCUMENTS

| | | | |
|---|---|---|---|
| 2,430,479 | 11/1947 | Pratt et al. | 428/425.1 |
| 2,468,713 | 4/1949 | Kropa et al. | 8/DIG. 11 |
| 3,248,259 | 4/1966 | Borsellino et al. | 427/393.2 |
| 3,341,550 | 9/1967 | Vail et al. | 8/187 |
| 3,384,606 | 5/1968 | Dieterich et al. | 260/29.2 TN |
| 3,472,606 | 10/1969 | Getchell et al. | 8/187 |
| 3,491,067 | 1/1970 | Sellet | 260/29.2 TN |
| 3,492,081 | 1/1970 | Morak | 8/192 |
| 3,660,010 | 5/1972 | Georgoudis et al. | 8/187 |
| 3,666,400 | 5/1972 | Lofton et al. | 8/186 |
| 3,695,924 | 10/1972 | Wagner | 260/29.2 TN |
| 3,748,291 | 7/1973 | Bhakuni et al. | 260/29.2 TN |
| 3,763,106 | 10/1973 | Markiewitz | 8/185 |
| 3,801,277 | 4/1974 | Gamarra et al. | 8/187 |
| 3,811,131 | 5/1974 | Gamarra et al. | 8/187 |
| 3,813,361 | 5/1974 | Gillis et al. | 260/29.2 TN |
| 3,898,197 | 8/1975 | Guise et al. | 260/29.2 TN |
| 4,127,382 | 11/1978 | Perry | 8/187 |

FOREIGN PATENT DOCUMENTS

| | | | |
|---|---|---|---|
| 1021767 | 2/1953 | France | 8/DIG. 11 |
| 47-46039 | 11/1972 | Japan | 8/DIG. 11 |
| 51-55499 | 5/1976 | Japan | 427/390 C |
| 985318 | 3/1965 | United Kingdom | 8/116 R |

*Primary Examiner*—Joseph L. Schofer
*Assistant Examiner*—Maria S. Tungol
*Attorney, Agent, or Firm*—Oblon, Fisher, Spivak, McClelland & Maier

[57] ABSTRACT

A textile finishing composition comprises a water dispersible urethane prepolymer and a water soluble methylol compound, a glyoxalamide adduct, or bis($\beta$-hydroxyethyl) sulfone.

8 Claims, No Drawings

TEXTILE FINISHING COMPOSITION

BACKGROUND OF THE INVENTION

1. Field of the Invention

The present invention relates to a novel textile finishing composition which imparts excellent shrinkage resistance, crease resistance, resilience and bulkiness to textiles.

2. Description of the Prior Arts

Heretofore, in order to impart desirable characteristics to textiles, methylol type finishing agents have been used. However, in order to prevent free formaldehyde pollution, caused during and after the treatment, various non-formaldehyde type finishing agents have been proposed and developed. (Senshoku Kogyo Vol. 22 No. 12 Pages 10 to 28).

When low methylolation degree type finishing agents such as sesqimethylol carbamate, sesqimethylol methyl triazine etc, are used, the problem of free formaldehyde pollution is still serious as the regulation of free formaldehyde for children's textiles could not be satisfied.

Moreover, the low methylolation degree type finishing agents or non-formaldehyde type finishing agents such as glyoxal amide adduct are inferior to the methylol type finishing agents. In order to impart the same characteristics of crease resistance and shrinkage resistance, the former finishing agents should be used at remarkably high concentration whereby it is not economical and it can not solve the free formaldehyde problem.

Moreover, even though high concentration of the finishing agent is used, satisfactory resilience and bulkiness can not be attained.

The inventors have studied to improve the characteristics of non-formaldehyde type finishing agents.

SUMMARY OF THE INVENTION

It is an object of the present invention to provide a textile finishing composition which imparts excellent shrinkage resistance, crease resistance, resilience and bulkiness to textiles.

It is another object of the present invention to provide a textile finishing composition which shows substantially no free formaldehyde pollution during and after the finishing treatment.

The foregoing and other objects of the present invention have been attained by providing a textile finishing composition which comprises a water dispersible urethane prepolymer and a water soluble methylol compound, a glyoxal-amide adduct or bis($\beta$-hydroxyethyl) sulfone.

It is preferable to incorporate a catalyst especially a borofluoride and/or a zinc salt.

The water dispersible urethane prepolymer can be a urethane prepolymer having free terminal isocyanate groups or a urethane prepolymer having masked terminal isocyanate groups. The former is preferable. A mixture of the former and latter is also preferable.

DETAILED DESCRIPTION OF PREFERABLE EMBODIMENTS

The water dispersible urethane prepolymer (b) can be a urethane prepolymer prepared by reacting a polyfunctional isocyanate compound with a polyfunctional compound which is reactive to isocyanate such as polyoles. The urethane prepolymer can be chain-extended with a chainextender.

It is preferable to use a urethane prepolymer having free terminal isocyanate groups. However, it is also possible to use a urethane prepolymer having masked terminal isocyanate groups. The aqueous dispersion of urethane prepolymer can be (1) a dispersion prepared by emulsifying a non-self-emulsifiable urethane prepolymer with an emulsifier in water;

(2) a dispersion prepared by emulsifying a self-emulsifiable urethane prepolymer in water or (3) a dispersion prepared by emulsifying a non-self-emulsifiable urethane prepolymer with a self-emulsifiable urethane prepolymer in water.

When the aqueous dispersion (1) is used, the stability of the dispersion is not high and the emulsifier should be removed after the treatment, though it can be used for imparting said satisfactory characteristics. Thus, the aqueous dispersions of urethane prepolymer (2) or (3) are preferably used.

The self-emulsifiable urethane prepolymers are urethane prepolymers having hydrophilic units such as oxyethylene chain which can be prepared by reacting more than equivalent of a polyisocyanate with a polyether polyol, polyester polyol or polyether-ester polyol or a mixture thereof (optionally with a chain extender) together with a hydrophilic polymer having suitable molecular weight such as polyethyleneglycol, random or block copolymer of ethyleneoxide and propyleneoxide, or block copolymer of polyoxyethylene and polyoxytetramethylene. The incorporation of the hydrophilic unit in the urethane prepolymer can be attained by the conventional method. The ratio of the hydrophilic units can be selected as desired. When the hydrophilic units are too many, the water resistance is inferior whereas when the hydrophilic units are too few, the stability of dispersion is inferior. When the hydrophilic units are oxyethylene units, it is preferable to have about 10 to 90 wt. % of oxyethylene units in the urethane prepolymer.

The self-emulsifiable urethane prepolymer (c) can be also used as an emulsifier for dispersing a non-self-emulsifiable urethane prepolymer (d) in water. The ratio of (c) to (d) can be selected as desired depending upon the hydrophilic or hydrophobic properties of (c) and (d), and the ratio of (c):(d) is usually 10 to 90: 90 to 10.

The urethane prepolymers can be easily obtained by the conventional methods.

The polyfunctional isocyanates include tolylenediisocyanate, diphenylmethane diisocyanate, diphenyl diisocyanate, naphthalene diisocyanate, xylene, diisocyanate, hexamethylene diisocyanate, triphenylmethane triisocyanate, isophorone diisocyanate, and the other known polyisocyanates.

The polyfunctional compounds which are reactive to the polyisocyanate include polyester polyols prepared by reacting a polyol with a polycarboxylic acid; polyether polyols prepared by reacting a polyhydric alcohol (ethyleneglycol, glycerin, trimethylol propane and pentaerythritol) with ethyleneoxide and/or propyleneoxide, caprolactone polyol, polytetramethyleneglycol and the other known polyfunctional compounds.

The self-emulsifiable urethane prepolymers and the non-self-emulsifiable urethane prepolymers can be prepared as desired by selecting the polyisocyanate and the polyfunctional compound. The molecular weight and polymerization degree can be varied by using a suitable chain extender or polymerization regulator.

The ratio of the terminal isocyanate groups can be controlled by selecting the ratio of the starting materials. Either or both of the urethane prepolymers (c) and (d) can have isocyanate groups.

The ratio of the terminal isocyanate groups is preferably about 2 to 10 wt. %.

A part or whole of the terminal isocyanate groups can be masked with suitable masking agent such as ε-caprolactam, diethyl malonate, acetoactic acid ester, acetone oxime, acetylacetone, etc. Phenol and acid sulfite can be also used.

The masking of the terminal isocyanate groups is carried out to form stabilized terminal isocyanate groups. When the urethane prepolymer having stabilized terminal isocyanate groups is used for the textile finishing, the stabilized terminal isocyanate groups can be reactive to hydroxy groups of fiber or methylol groups and hydroxy groups of the other component in the heat-treatment and excellent effects are imparted by the reaction of the stabilized terminal isocyanate groups.

The molecular weight of the urethane prepolymer is preferably in a range of 500–10,000 especially 1,000–6,000. The other components (a) of water soluble methylol compounds glyoxal-amide adducts, β-hydroxyethyl sulfones are conventional nonformaldehyde type or amino-aldehyde type textile finishing agents.

It is preferable to use non-formaldehyde type textile finishing agents such as water soluble, glyoxal-amide adducts or bis(β-hydroxyethyl) sulfones.

The glyoxal-amide adducts include adducts of glyoxal and various amides such as urea, dimethylurea, diphenylurea, formamide, acetamide, methylenebisformamide, ethylenebisformamide, methyl carbamate, isopropyl carbamate, hydroxyethyl carbamate, acrylamide and pyrrolidone.

The methylol compounds are condensates of amino compound and formaldehyde, for example, methylol compounds of cyclic urea derivatives such as dimethylol ethyleneurea, dimethylol propyleneurea, dimethylol dihydroxyethyleneurea, dimethylol urone, dimethylol ethyl triazone and dimethylol hydroxyethyl triazpone; methylol compounds of acid amides such as dimethylol acrylamide and dimethylol adipic acid amide, methylol compounds of carbamates such as dimethylol methyl carbamate, dimethylol isopropyl carbamate, dimethylol hydroxyethyl carbamate and dimethylol methoxymethyl carbamate; methylol compounds of triazines such as pentamethylol melamine, and hexamethylol melamine and lower alcohol ethers thereof and lower aliphatic acid esters thereof. The water soluble oligomers of the methylol compounds can be also used.

A crosslinking agent such as tetraoxane and pentoxane can be also added. Other additives such as an antielectrostatic agent, stain preventing agent, softeners, polysiloxanes etc. can be added to the textile finishing composition.

The catalysts used for the textile finishing include borofluorides such as magnesium, zinc, tin or antimony borofluoride. Magnesium or zinc borofluoride is especially preferable. Sodium borofluoride and zinc chloride or magnesium chloride can be combined. The catalysts can be also zinc compounds such as zinc nitrate and zinc chloride.

The amount of the catalyst is usually in a range of 0.5 to 50 wt. % preferably 5 to 30 wt. % based on the weight of finishing agent.

The textile finishing composition of the present invention can be obtained by combining the component (a) and the water dispersible urethane prepolymer (b). The resulting composition has improved stability, even though the water dispersible urethane prepolymer having free terminal isocyanate groups is used because the free terminal isocyanate groups may be stabilized by the component (a) the stabilization effect is remarkable by using excess of the component (a). When the water dispersible urethane prepolymer having masked terminal isocyanate groups is used, the effect of the combination of the component (a) with the water dispersible urethane prepolymer (b) is imparted in the heat-treatment. The effect of the combination is remarkable.

The component (a) and the water dispersible urethane prepolymer (b) can be mixed by various methods. For example, (1) the component (a) is added to the urethane prepolymer (b) just after forming it and dispersing it in water;

(2) the urethane prepolymer (b) is dispersed in the aqueous solution of the component (a);

(3) the aqueous solution of the component (a) is mixed with the aqueous dispersion of the urethane prepolymer (b).

When the terminal isocyanate groups are free, it is preferable to use excess of the component (a). When a large excess of the component (a) is added, the mixture of the component (a) and the reaction product of the component (a) and the urethane prepolymer (b) is obtained.

Although the reaction product is the important active ingredient for the textile finishing composition, it is preferable to use the mixture of the component (a) and the reaction product. Accordingly, the ratio of the component (a) to the urethane prepolymer (b) is usually about 20 to 95: 50 to 5 preferably about 60 to 95: 40 to 5.

The ratio is decided depending upon the selection and combination of the component (a) and the urethane prepolymer (b) and the kind of the fiber and the feeling of the textiles, and the other factors. In general, when the ratio of the urethane prepolymer (b) is higher, the resilience and shrinkage resistance are superior so as to be suitable for cellulosic textiles. On the other hand when the ratio of the urethane prepolymer (b) is lower, the softness is superior so as to be suitable for synthetic fiber textiles.

The textile finishing composition of the present composition can comprise other textile finishing additives such as a small amount of a surfactant and a catalyst for the textile finishing. It is also possible to comprise a chain extender, a polymerization retardant etc.

The textile finishing composition of the present invention is usually an aqueous dispersion (5 to 50% of components for solid). The concentration is controlled to apply it.

The textile finishing composition of the present invention is mainly applied for cellulosic textile or cellulosic fiber containing textile though it can be also applied for the other natural fiber textiles or synthetic fiber textiles.

The textile finishing composition can be applied with the conventional methylol type, low methylolation degree type or non-formaldehyde type textile finishing agent. In the case of the combination, various feelings can be imparted depending upon the embodiment.

The textile finishing composition of the present invention is diluted to suitable concentration with water and optionally other additives, it is applied to the textile by a conventional method such as an immersing, printing, coating, padding, and spraying, and it is mangled at suitable wet pick-up and dried and cured at 100° to 180° C. for about 1 to 5 minutes to obtain the textile having excellent crease resistance, shrinkage resistance, resilience and bulkiness. The take-up can be less than 20 wt. % especially 2 to 10 wt. % as the active ingredients to a textile.

In accordance with the present invention, only about 50 to 70 wt. % of the textile finishing agent is required for imparting the same crease resistance and shrinkage resistance in comparison with the conventional non-formaldehyde type textile finishing agents. Accordingly, the formation of the free formaldehyde can be reduced and it is economical. Moreover, the resilience and bulkiness can be attained even though they could not be attained by using the conventional ones.

The reason why the synergistic effect of the combination is attained is not clear but it is considered to be caused by the resulting reaction product. When the urethane prepolymer having the masked terminal isocyanate groups is used, the reaction product may be formed in the heat-treatment by activating the masked terminal isocyanate groups and reacting with hydroxy groups of the component (a).

When the component (a) and the water dispersible urethane prepolymer (b) are combined, a small amount of impurity such as an amine in the compound (a) or formed in the treatment is caught by the prepolymer and the trouble of smell during the treatment and the smell of the treated textile can be prevented.

The following examples will further illustrate the embodiment of the present invention. In these examples, all parts and percents given are by weight unless otherwise noted.

EXAMPLE 1

In a reactor, 800 parts of a polyester prepared by reacting 1,6-hexanediol with adipic acid and 200 parts of ethyleneoxide-propyleneoxide copolymer (9:1 of EO:PO) were charged and the mixture was stirred at about 50° C. in nitrogen gas atmosphere and 233.5 parts of isophorone diisocyanate (NCO/OH=1.9) was added to the mixture and the addition polymerization was carried out at about 80° to 90° C. for 4 hours with stirring to obtain an urethane prepolymer having 4.2% of terminal isocyanate groups. Cold water at lower than 5° C. was gradually added to 1000 parts of the urethane prepolymer and the mixture was vigorously stirred at lower than 20° C. for 20 minutes to obtain an aqueous dispersion of urethane prepolymer having 40% of a solid content (A).

The aqueous dispersion was mixed with 5800 parts of 40% aqueous solution of dimethylol ethyleneurea (a) and the mixture was stirred for 12 hours to obtain the textile finishing agent(I).

EXAMPLE 2

In accordance with the process of Example 1 except using 5,800 parts of 40% aqueous solution of dimethyl dihydroxy ethyleneurea (c) instead of the aqueous solution of dimethylol ethyleneurea, the textile finishing agent (II) was obtained. Dimethyl dihydroxy ethyleneurea (c) was 1,3-dimethyl-4,5-dihydroxy ethyleneurea (c) in the examples.

EXAMPLE 3

To 1000 parts of the urethane prepolymer obtained in Example 1, 500 parts of cold water at lower than 5° C. was added dropwise and the mixture was vigorously stirred at lower than 20° C. to emulsify it. Then, a mixture of cold water at lower than 5° C. and 63.75 parts of isophorone diamine was added dropwise to the emulsion. The mixture was further vigorously stirred for about 20 minutes to obtain an aqueous dispersion of urethane prepolymer having terminal isocyanate groups and having 40% of a solid content (B).

The amount of isophorone diamine as the chain extender was 70% of equivalent to the terminal isocyanate groups.

The aqueous dispersion was mixed with 7800 parts of 40% aqueous solution of dimethyl dihydroxy ethyleneurea and the mixture was stirred for 12 hours to obtain the textile finishing agent (III).

EXAMPLE 4

The urethane prepolymer (100 parts) obtained in Example 1 was cooled to 50° C. and methylethyltoneoxime was added dropwise to it and the reaction was carried out at the maximum of 80° C. for 4 hours to stabilize about 20% of isocyanate groups as the masking agent. The mixture was cooled to 20° C. and 1 part of a nonionic surfactant was added to it and cold water at lower than 5° C. was added dropwise to the mixture at lower than 20° C. to obtain an aqueous dispersion of urethane prepolymer having terminal isocyanate groups and having 40% of a solid content (C).

The aqueous dispersion was mixed with 7600 parts of 40% aqueous solution of dimethylol ethyleneurea (a) and the mixture was stirred for 12 hours to obtain the textile finishing agent (IV).

EXAMPLE 5

In a reactor, 200 parts of polypropyleneglycol having about 1000 of an average molecular weight was mixed with 70 parts of hexamethylene diisocyanate to react them at 80° C. for 4 hours and urethane prepolymer having about 6.1% of terminal isocyanate groups was obtained. Cold water containing 10 parts of a nonionic surfactant was added to 675 parts of a prepolymer to obtain an aqueous dispersion having 40% of a solid content (D).

The mixture of 200 parts of the aqueous dispersion and 800 parts parts of 40% aqueous solution of formamide glyoxal (2:1)(d) was stirred for 6 hours to obtain the textile finishing agent (V).

EXAMPLE 6

In nitrogen atmoshere, 100 parts of ethyeleneoxide-propyleneoxide copolymer (9:1 of EO:PO) having about 2000 of an average molecular weight and 26 .2 parts of hydrogenated diphenylmethane diisocyanate were mixed to react them at 90° to 100° C. for 5 hours and an urethane prepolymer having about 4.1% of terminal isocyanate groups was obtained. The urethane prepolymer was emulsified in water to obtain an aqueous dispersion having 40% of a solid content (E).

The mixture of 300 parts of the aqueous dispersion and 1200 parts of 40% aqueous solution of dimethylol dihydroxy ethyleneurea (e) was stirred for 6 hours to obtain the textile finishing agent (VI).

EXAMPLE 7

In a reactor, 100 parts of a triol prepared by copolymerizing ethyleneoxide and propyleneoxide at a ratio of 1:9 with a polymerization initiator of glycerine and 41.3 parts of hexamethylene diisocyanate were mixed to react them at 70° to 80° C. for 5 hours and an urethane prepolymer having about 6.0% of terminal isocyanate groups was obtained.

On the other hand, 100 parts of polyoxyethyleneglycol having about 2000 of an average molecular weight and 22.2 parts of isophorone diisocyanate were mixed to react them at 70° to 80° C. for 3 hours and an urethane prepolymer having 3.5% of terminal isocyanate groups was obtained. The mixture of 100 parts of the former prepolymer and 40 parts of the latter prepolymer was dispersed in water to obtain an aqueous dispersion having 40% of a solid content (F).

The mixture of 300 parts of the aqueous dispersion and 700 parts of 40% aqueous solution of dimethyl dihydroxy ethyleneurea was stirred for 6 hours to obtain the textile finishing agent (VII).

EXAMPLE 8

In nitrogen gas atmosphere, 22.7 parts of trimethylol propane was added to 333.5 parts of hexamethylene diisocyanate at 90° to 100° C. for 3 hours and the reaction was further continued for 2 hours to obtain an urethane prepolymer having about 3.9% of terminal isocyanate groups.

On the other hand, 100 parts of a triol having an average molecular of 3000 weight prepared by reacting ethyleneoxide with ethylenediamine and 14.1 parts of hexamethylene diisocyanate were mixed to react them at 50° to 60° C. for 3 hours and a self-emulsifiable urethane prepolymer having 2.54% of terminal isocyanate groups was obtained.

The mixture of 100 parts of the former prepolymer and 40 parts of the latter prepolymer was dispersed in water to obtain an aqueous dispersion having 40% of a solid content (G).

200 parts of the aqueous dispersion was added to 800 parts of 40% aqueous solution of ethylene bisformamide glyoxal (1:1) (b) and the mixture was stirred for 6 hours to obtain the textile finishing agent (VIII).

EXAMPLE 9

In a reactor, 800 parts of a polyester prepared by reacting 1,6-hexanediol with adipic acid and 200 parts of ethyleneoxide-propyleneoxide copolymer (9:1 of EO:PO) were charged and the mixture was stirred at about 50° C. in nitrogen gas atmosphere and 233.5 parts of isophorone diisocyanate (NCO/OH=1.9) was added to the mixture and the mixture was stirred at about 80° to 90° C. for 4 hours and ε-caprolactam was added and the mixture was stirred at 70° to 80° C. for 2 hours to obtain an urethane prepolymer having 3.8% of stabilized terminal isocyanate groups.

Cold water at lower than 5° C. was added dropwise to 100 parts of the urethane prepolymer and the mixture was vigorously stirred at lower than 20° C. for 20 minutes to obtain an aqueous dispersion of urethane prepolymer having stabilized terminal isocyanate groups and 40% of a solid content (H).

The aqueous dispersion was mixed with 5800 parts of 40% aqueous solution of dimethylol ethyleneurea (a) to obtain the textile finishing agent (IX).

EXAMPLE 10

In accordance with the process of Example 9 except using 5800 parts of 40% aqueous solution of dimethyl dihydroxy ethyleneurea instead of the aqueous solution of dimethylol ethyleneurea, the textile finishing agent (X) was obtained.

EXAMPLE 11

ε-caprolactam was added to 1000 parts of the unstabilized urethane prepolymer of Example 9 at 30% of equivalent to the terminal isocyanate groups to stabilize 30% of the terminal isocyanate groups and 500 parts of cold water at lower than 5° C. was added dropwise to it, and the mixture was vigorously stirred at lower than 20° C. to emulsify it. The mixture of cold water at lower than 5° C. and 63.75 parts of isophorone diamine was added dropwise to it and the mixture was vigorously stirred for about 20 minutes to obtain an aqueous dispersion of urethane prepolymer having terminal isocyanate groups and 40% of a solid content (I).

The amount of isophorone diamine as the chain extender was 70% of equivalent to the terminal isocyanate groups.

The aqueous dispersion was mixed with 7800 parts of 40% aqueous solution of dimethyl dihydroxy ethyleneurea to obtain the textile finishing agent (XI).

EXAMPLE 12

In a reactor, 200 parts of polypropyleneglycol (MW 1000) and 70 parts of hexamethylene diisocyanate were mixed to react them at 80° C. for 4 hours and methylethylketoneoxime was added to it and the reaction was carried out at 80° C. for 2 hours to obtain an urethane prepolymer having 5.7% of stabilized terminal isocyanate groups. Cold water containing 10 parts of a nonionic sufactant was added to 250 parts of the urethane prepolymer to obtain an aqueous dispersion of urethane prepolymer (40% of solid content) (J). 200 parts of the aqueous dispersion was added to 800 parts of 40% aqueous solution of formamide glyoxal (2:1) to obtain the textile finishing agent (XII).

EXAMPLE 13

100 parts of ethyleneoxidepropyleneoxide copolymer (9:1 of EO:PO) (MW about 2000) was mixed with 26.6 parts of hydrogenated diphenylmethane diisocyanate in nitrogen gas atmosphere to react them at 90° to 100° C. for 5 hours, and acetoneoxim was added to it and the reaction was carried out for 2 hours to obtain an urethane prepolymer having 3.3% of stabilized terminal isocyanate groups.

The urethane prepolymer was emulsified in water to obtain an aqueous dispersion of urethane prepolymer (40% of solid content) (K).

300 parts of the aqueous dispersion was mixed with 1200 parts of 40% aqueous solution of dimethylol dihydroxy ethyleneurea (e) to obtain the textile finishing agent (XIII).

EXAMPLE 14

In a reactor, 100 parts of a triol prepared by copolymerizing ethyleneoxide and propyleneoxide at a ratio of 1:9 with a polymerization initiator of glycerine and 30 parts of hexamethylene diisocyanate were mixed to react them at 70° to 80° C. for 5 hours and methylethylketonoxime was added to it to react them and an urethane prepolymer having about 4.2% of stabilized terminal isocyanate groups was obtained.

On the other hand, 100 parts of polyoxyethyleneglycol (MW about 2000) and 17.4 parts of isophorone diisocyanate were mixed to react them at 70° to 80° C. for 3 hours and acetoneoxime was further reacted to obtain an urethane prepolymer having 3.4% of stabilized terminal isocyanate group.

The mixture of 100 parts of the former prepolymer and 40 parts of the latter prepolymer was dispersed in water to obtain an aqueous dispersion (40% of solid content) (L).

The mixture of 300 parts of the aqueous dispersion and 700 parts of 40% aqueous solution of 1,3-dimethyl-4,5-dihydroxy ethyleneurea (c) was stirred to obtain the textile finishing agent (XIV).

EXAMPLE 15

In nitrogen gas atmosphere, 100 parts of triol was added to 22.7 parts of hexamethylene diisocyanate at 90° to 100° C. for 3 hours and the reaction was further continued for 2 hours and ε-caprolactam was reacted for 2 hours to obtain an urethane prepolymer having about 3.8% of stabilized terminal isocyanate groups.

On the other hand, 100 parts of tetraol having 3000 of an average molecular weight prepared by reacting ethyleneoxide with ethylenediamine and 22.4 parts of hexamethylene diisocyanate were mixed to react them at 50° to 60° C. for 3 hours and methylethylketonoxim was reacted for 2 hours to obtain a self-emulsifiable urethane prepolymer having 3.4% stabilized terminal isocyanate groups was obtained.

The mixture of 100 parts of the former prepolymer and 40 parts of the latter prepolymer was dispersed in water to obtain an aqueous dispersion having 40% of a solid content (M).

200 parts of the aqueous dispersion was added to 800 parts of 40% aqueous solution of ethylene bisformamide glyoxal (1:1) and the mixture was stirred to obtain the textile finishing agent (XV).

Test I

The effects of the textile finishing agents prepared by the processes of Examples 1 to 15 to a cotton fabric were tested in comparison with the effects of the known textile finishing agents.

(1) Preparation of bath:
  Finishing agent (40% aqueous dispersion): 3.5 or 5 parts
  Catalyst: 2 parts
  Water to 100 parts (2) Condition for treatment:
Each cotton broad cloth was dipped and mangled twice to give 80% of a wet pick-up, and the cloth was pretreated at 100° C. for 5 to 6 minutes and then, heat-treated at 150° C. for 3 minutes.

(3) Evaluation:
  (1) Crease resistance: AATCC 66-1975 (Monsanto method), warp plus filling (degree)
  (2) Shrinkage percentage: Japanese Industrial Standard 1042 D (Soap solution method), warp direction (%)
  (3) Free formaldehyde: Free formaldehyde was measured by the acetyl acetone method. (Law for the control of Household Goods containing Harmful Substances Law No. 112 of 1973)
  (4) Resilience and bulkiness: Resilience and bulkiness were evaluated by handling tests.

(4) Results:

Table 1

| Exp. | | Textile finishing agent | | Catalyst | Free formaldehyde (ppm) | Crease resistance(°) | Shrinkage percentage(%) | Resilience | Bulkiness |
|---|---|---|---|---|---|---|---|---|---|
| | | type | parts | | | | | | |
| | 1 | I | 5 | 40% $Z_n(BF_4)_2$ | 50 | 295 | 2.4 | O | O |
| | 2 | II | 5 | " | 0 | 254 | 3.4 | O | O |
| | 3 | III | 5 | " | 0 | 266 | 2.9 | O | O |
| | 4 | IV | 5 | " | 55 | 292 | 2.4 | O | O |
| | 5 | V | 5 | " | 0 | 245 | 3.5 | O | O |
| | 6 | VI | 5 | " | 21 | 284 | 2.3 | O | O |
| | 7 | VII | 5 | " | 0 | 265 | 3.0 | O | O |
| | 8 | VIII | 5 | " | 0 | 261 | 3.0 | O | O |
| Ref. | 1 | a | 5 | " | 500 | 255 | 2.6 | O | X |
| " | 2 | b | 5 | " | 0 | 226 | 3.9 | O | X |
| " | 3 | c | 5 | " | 0 | 220 | 3.5 | O | X |
| " | 4 | d | 5 | " | 0 | 218 | 3.8 | O | X |
| " | 5 | e | 5 | " | 200 | 232 | 3.4 | O | X |
| " | 6 | A | 5 | " | 0 | 206 | 5.9 | Δ | O |
| " | 7 | B | 5 | " | 0 | 198 | 6.0 | Δ | O |
| " | 8 | C | 5 | " | 0 | 211 | 5.8 | Δ | O |
| " | 9 | D | 5 | " | 0 | 192 | 6.1 | Δ | O |
| " | 10 | E | 5 | " | 0 | 198 | 6.3 | Δ | O |
| " | 11 | F | 5 | " | 0 | 203 | 5.9 | Δ | O |
| " | 12 | G | 5 | " | 0 | 203 | 6.2 | Δ | O |
| " | 13 | a | 3.5 | " | 320 | 235 | 3.4 | O | X |
| " | 14 | e | 3.5 | " | 123 | 220 | 3.8 | O | X |
| " | 15 | a | 5 | 50% $MgCl_2$ $6H_2O$ | 600 | 250 | 3.0 | O | X |
| " | 16 | b | 5 | 50% $MgCl_2$ $6H_2O$ | 0 | 205 | 4.2 | O | X |

Table 1-continued

| Exp. | Textile finishing agent type | parts | Catalyst | Free formaldehyde (ppm) | Crease resistance(°) | Shrinkage percentage(%) | Resilience | Bulkiness |
|---|---|---|---|---|---|---|---|---|
| " 17 | e | 5 | 50% MgCl₂ 6H₂O | 280 | 228 | 3.5 | ◎ | X |
| " 18 | none | — | — | — | 170 | 7.3 | X | X | note 1:
◎ excellent
○ good
△ no good
X bad

Table 2

| Exp. | Textile finishing agent type | parts | Catalyst | Free formaldehyde (ppm) | Crease resistance(°) | Shrinkage percentage(%) | Resilience | Bulkiness |
|---|---|---|---|---|---|---|---|---|
| 9 | IX | 5 | 40% $Z_n(BF_4)_2$ | 55 | 289 | 2.5 | ◎ | ◎ |
| 10 | X | 5 | " | 0 | 243 | 3.4 | ◎ | ◎ |
| 11 | XI | 5 | " | 0 | 252 | 3.0 | ◎ | ◎ |
| 12 | XII | 5 | " | 0 | 231 | 3.5 | ◎ | ◎ |
| 13 | XIII | 5 | " | 24 | 267 | 2.9 | ◎ | ◎ |
| 14 | XIV | 5 | " | 0 | 260 | 3.2 | ◎ | ◎ |
| 15 | XV | 5 | " | 0 | 247 | 3.3 | ◎ | ◎ |
| Ref. 19 | H | 5 | " | 0 | 204 | 6.0 | △ | ◎ |
| " 20 | I | 5 | " | 0 | 193 | 6.1 | △ | ◎ |
| " 21 | J | 5 | " | 0 | 190 | 6.3 | △ | ◎ |
| " 22 | K | 5 | " | 0 | 197 | 6.3 | △ | ◎ |
| " 23 | L | 5 | " | 0 | 200 | 6.0 | △ | ◎ |
| " 24 | M | 5 | " | 0 | 201 | 6.3 | △ | ◎ |

Test II

100% cotton broad cloth (40×30/133×67) which was treated by scouring, bleaching and mercerizing was dipped in the following bath and mangled at a wet pick-up of 75% and dried at 80° C. for 4 minutes and heat-treated at 150° C. for 3 minutes and then, treated by a soaping at 60° C. for 1 minute with an aqueous solution of 0.1% of sodium carbonate and 0.1% of an anionic surfactant and washing with water and drying it. The crease resistance and the tensile strength (strip method; width 2.5 cm, filling) were measured. The results are shown in Table 3.

Bath:
1,3-Dimethyl-4,5-dihydroxy ethyleneurea
Urethane prepolymer XVI or XVII (30% dispersion)
Zinc borofluoride (40%): 1 part
Water to 100 parts Urethane prepolymer XVI:
In a reactor, 33.6 g (0.2 mole) of hexamethylene diisocyanate and 100 g (0.1 mole) of polyester diol (MW 1,000) prepared by reacting adipic acid with 1,4-butanediol, were mixed to react them at 120° to 130° C. for 20 minutes in nitrogen gas atmosphere to obtain an urethane prepolymer having 6.1% of terminal isocyanate groups (MW 1,350) (N). The product was cooled to 50° C. and 18 g (0.22 mole) of t-butanol was added to mask the terminal isocyanate groups, and the product was emulsified with an anionic surfactant and water to obtain an aqueous dispersion of urethane prepolymer (30% solid content).

Urethane prepolymer (XVII):
Diethyl malonate was added to the urethane prepolymer (N) to mask the terminal isocyanate groups and the product was emulsified with an anionic surfactant and water to obtain an aqueous dispersion of urethane prepolymer (30% solid content).

Table 3

| 1,3-Dimethyl-4,5-dihydroxy ethyleneurea | Urethane prepolymer | Crease resistance (°) | Tensile strength (kg) |
|---|---|---|---|
| 2 | — | 205 | 18.0 |
| 4 | — | 215 | 11.5 |
| 8 | — | 220 | 9.5 |
| — | XVI  5 | 200 | 12.0 |
| — | 10 | 210 | 11.0 |
| — | 20 | 238 | 10.2 |
| 2 | 5 | 238 | 11.5 |
| 2 | 10 | 251 | 10.8 |
| 4 | 5 | 253 | 10.8 |
| 4 | 10 | 269 | 10.5 |
| — | XVII  5 | 202 | 12.1 |
| — | 10 | 216 | 10.8 |
| — | 20 | 235 | 10.3 |
| 2 | 5 | 248 | 11.5 |
| 2 | 10 | 258 | 10.5 |
| 4 | 5 | 263 | 10.5 |
| 4 | 10 | 276 | 10.0 |
| None | — | 170 | 17.5 |

Test III

The 100% cotton broad cloth of Test II was treated by the process of Test II except using the following bath. The results are shown in Table 4.

Bath:
1,3-Dimethyl-4,5-dihydroxy ethyleneurea: 4 parts
Urethane prepolymer (XVII)
Catalyst
Water to 100 parts Table 4

| Urethane prepolymer | Catalyst for curing type | Amount (parts) | Crease resistance (°) |
|---|---|---|---|
| none | 40% $Z_n(BF_4)_2$ | 0.9 | 205 |
| " | 50% $Z_n(NO_3)_2 6H_2O$ | 1.5 | 196 |
| " | Dibutyl tin dilaurate | 0.5 | 180 |
| 5.0 parts | 50% $Z_n(BF_4)_2$ | 0.9 | 263 |
| " | 50% $Z_n(NO_3)_2 6H_2O$ | 1.5 | 258 |

Table 4-continued

| Urethane prepolymer | Catalyst for curing type | Amount (parts) | Crease resistance (°) |
|---|---|---|---|
| " | Dibutyl tin dilaurate | 0.5 | 180 |
| none | none | — | 175 |

TEST IV

The 100% cotton broad cloth of Test II was treated by the process of Test II except using the following bath. The results are shown in Table 5.
Bath:
  1,3-Diethyl-4,5-dihydroxy ethyleneurea: 4 parts
  Polymer
  Zinc borofluoride (40%): 0.9 part
  Water to 100 parts
Stiffness:

The stiffness was measured by Japanese Industrial Standard L-1079-A (Cantilever method).
Urethane prepolymer XVIII:

In a reactor, 42 g (0.25 mole) of hexamethylene diisocyanate and 16.4 g (0.2 mole) of butanediol were mixed to react them at 120° to 130° C. for 20 minutes in nitrogen gas atmosphere to obtain an urethane prepolymer having 7.1% of terminal isocyanate groups. The product was cooled to 50° C. and 18 g (0.22 mole) of t-butanol was added to mask the terminal isocyanate groups and the product was emulsified with an anionic surfactant and water to obtain an aqueous dispersion of urethane prepolymer (30% solid content).

Table 5

| | Polymer | | Crease | |
|---|---|---|---|---|
| Type | | Amount (part) | resistance (°) | Stiffness (warpline) |
| Urethane prepolymer XVIII | | 5 | 250 | 37 |
| | | 10 | 265 | 40 |
| N-methylol acrylamide/ ethylacrylate/butyl acrylate = 2:50:48 copolymer (45% dispersion) | | 3.3 | 240 | 55 |
| | | 6.7 | 245 | 60 |
| glycidyl methacrylate/ ethylacrylate/butyl acrylate = 5:55:40 copolymer (45% dispersion) | | 3.3 | 220 | 58 |
| | | 6.7 | 230 | 60 |
| Polyurethane elastomer water soluble 30% non-reactive type prepared from polyethylene glycol and TDI | | 5 | 220 | 53 |
| | | 10 | 230 | 60 |
| Adduct of TDI (3 mole) to glycerin masked with t-butanol (30% dispersion) | | 5 | 225 | 60 |
| | | 10 | 235 | 67 |
| none | | | | 55 |

TDI: tolylene diisocyanate

Test V

The 100% cotton broad cloth of Test II was treated by the process of Test II except using the following bath. The crease resistance, the tensile strength and a wash-and-wear property (AATCC 88C-1978 40° C. washing drip-dry method) were measured. The results are shown in Table 6.
Bath:

| | A | B | C |
|---|---|---|---|
| Dimethylol hydroxy ethyl triazone | 5 (part) | 8 (part) | 10 (part) |
| Dimethylol methyl carbamate | 3 | 0 | — |
| Tetraoxane | — | 2 | — |
| Additive (30% emulsion) | x | x | x |
| Zinc borofluoride (40%) | 4 | 4 | 4 |
| Water to | 100 | 100 | 100 |

Note:
  DMPS: dimethyl polysiloxane
  PE: polyethylene
  Ureth XIX:
    In a reactor, 100 g (0.1 mole) of polyester diol (MW 1,000) prepared by reacting adipic acid with diethyleneglycol and 33.6 g (0.2 mole) of hexamethylene diisocyanate were mixed to react them at 90° to 100° C. for 120 minutes in nitrogen gas atmosphere to obtain an urethane prepolymer having 6.1% of terminal isocyanate groups. (MW 1,358). The urethane prepolymer was cooled and 2.8 g (0.22 mole) of ε-caprolactam was reacted to mask the terminal isocyanate groups. The product was emulsified with pluronic surfactant to obtain an aqueous dispersion of urethane prepolymer (30% solid content).
  PUE: Water soluble non-reactive type polyurethane prepared by reacting polyethyleneglycol (MW 1,000) with TDI. (30% aqueous solution).

Table 6

| Bath | Additive Type | Amount (part) | Crease resistance (°) | Wash and wear (class) | Tensile strength (kg) (warp) |
|---|---|---|---|---|---|
| A | DMP | 0 | 245 | 2.2 | 13.0 |
| | DMPS | 3 | 246 | 2.5 | 11.8 |
| | PE | 2 | 249 | 2.5 | 11.8 |
| | DMPS + PE | 3 + 2 | 249 | 2.5 | 11.5 |
| | Ureth XIV | 5 | 268 | 4 | 14.1 |
| | Ureth XIX + DMPS | 2 + 4 | 275 | 4 | 13.8 |
| | PUE | 5 | 250 | 2.8 | 13.0 |
| B | — | 0 | 245 | 2.2 | 11.2 |
| | DMPS | 5 | 250 | 2.5 | 10.3 |
| | Ureth XIX | 5 | 275 | 4 | 13.0 |
| | PUE | 5 | 250 | 2.5 | 11.1 |
| C | — | 0 | 246 | 2.2 | 11.0 |
| | DMPS | 5 | 251 | 2.5 | 10.5 |
| | untreated cloth | | 175 | 1 | 22.1 |

Test VI

The 100% cotton broad cloth of Test II was treated by the process of Test II except using the following bath. The results are shown in Table 7.
Bath:
  Dimethylol hydroxyethyl triazone (50%): 5 parts
  Dimethylol dihydroxy ethyleneurea (40%): 5 parts
  Urethane prepolymer XIX: 0 or 5 parts
  Catalyst (40%): X parts
  Water to 100 parts Table 7

| Urethane prepolymer parts | Catalyst Type | Amount (parts) | Wash and wear (class) | Crease resistance (°) |
|---|---|---|---|---|
| 0 | $Zn(BF_4)_2$ | 1.5 | 2.7 | 246 |
| | $Zn(NO_3)_2 6H_2O$ | 1.0 | 2.7 | 244 |

Table 7-continued

| Urethane prepolymer parts | Catalyst Type | Amount (parts) | Wash and wear (class) | Crease resistance (°) |
|---|---|---|---|---|
| | $Z_nCl_2$ | 1.5 | 2.5 | 240 |
| | $Mg(BF_4)_2$ | 1.5 | 2.5 | 240 |
| | $MgCl_26H_2O/NH_4H_2PO_4$(8/1 wt) | 1.5 | 2.7 | 240 |
| 5 | $Z_n(BF_4)_2$ | 1.5 | 4 | 275 |
| | $Z_n(NO_3)_26H_2O$ | 1.0 | 4 | 268 |
| | $Z_nCl_2$ | 1.5 | 3.7 | 265 |
| | $Mg(BF_4)_2$ | 1.5 | 4 | 268 |
| | $MgCl_26H_2O/NH_4H_2PO_4$(8/1 wt) | 1.5 | 4 | 265 |
| | untreated cloth | — | 1 | 175 |

What is claimed is:

1. A textile finishing composition which comprises
(i) a water dispersible urethane prepolymer having free or heat-activatable masked terminal isocyanate groups
(ii) a glyoxal-amide adduct or bis (β-hydroxyethyl) sulfone at a ratio of 80 to 5:20 to 95.

2. A textile finishing composition according to claim 1 wherein the ratio of the water dispersible urethane prepolymer to the glyoxal-amide adduct or bis(ε-hydroxyethyl) sulfone is 40 to 50:60 to 95.

3. A textile finishing composition according to claim 1 wherein the free isocyanate groups are reacted with the glyoxal-amide adduct.

4. A textile finishing composition according to claim 1 wherein the water dispersible urethane prepolymer comprises a self-emulsifiable urethane prepolymer having hydrophilic units.

5. A textile finishing composition according to claim 1 wherein the aqueous dispersion of urethane prepolymer is prepared by using at least part of a self-emulsifiable urethane prepolymer.

6. A textile finishing composition according to claim 1 wherein a catalyst of a borofluoride or a zinc compound is added.

7. A textile finishing composition according to claim 1 wherein the water soluble glyoxal-amide adduct is combined with the water dispersible urethane prepolymer.

8. The textile finishing composition of claim 1 wherein the amount of said free or blocked isocyanate groups is 2–10% weight of said urethane prepolymer.

* * * * *